United States Patent [19]

Anderson et al.

[11] Patent Number: 4,663,922
[45] Date of Patent: May 12, 1987

[54] QUICK ATTACH APPARATUS FOR CROP HARVEST HEADER AND THE LIKE

[75] Inventors: J. Dale Anderson; Kenneth R. McMillen, both of Canton; Arnold E. Goertz, Buhler, all of Kans.

[73] Assignee: Hesston Corporation, Hesston, Kans.

[21] Appl. No.: 851,481

[22] Filed: Apr. 14, 1986

Related U.S. Application Data

[63] Continuation of Ser. No. 618,821, Jun. 8, 1984, abandoned.

[51] Int. Cl.⁴ .............................................. A01D 35/12
[52] U.S. Cl. ........................................ 56/15.6; 56/228; 172/272; 37/231; 280/479 R
[58] Field of Search .................. 56/15.6, 228, DIG. 9; 172/272, 273, 274; 37/231; 280/479

[56] References Cited

U.S. PATENT DOCUMENTS 3,760,883  9/1973  Birk ........................................ 37/231
4,444,000  4/1984  Enzmann et al. ..................... 56/15.6

Primary Examiner—Gene Mancene
Assistant Examiner—John G. Weiss
Attorney, Agent, or Firm—Schmidt, Johnson, Hovey & Williams

[57] ABSTRACT

Quick attachment of crop handling headers to harvesters employs one or more wedge locks, utilizing the mechanical forces thereof to, in turn, tightly and firmly wedge an elongated tongue portion of the header into mating relationship with a header-supporting channel member on the harvester. For fast and easy attachment and release, reciprocable wedge-like latches are jammed into corresponding keepers with progressively increased tightness through use of reciprocable latch shifters readily accessible to the operator at ground level exteriorly of the ends of the header support. An exceptionally strong joint is effected as the latches and their keepers jam the tongue into the channel member.

1 Claim, 8 Drawing Figures

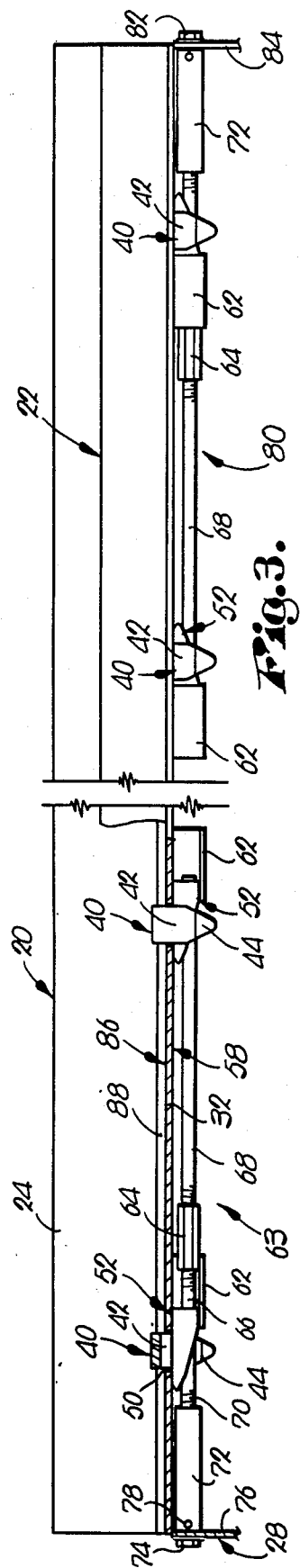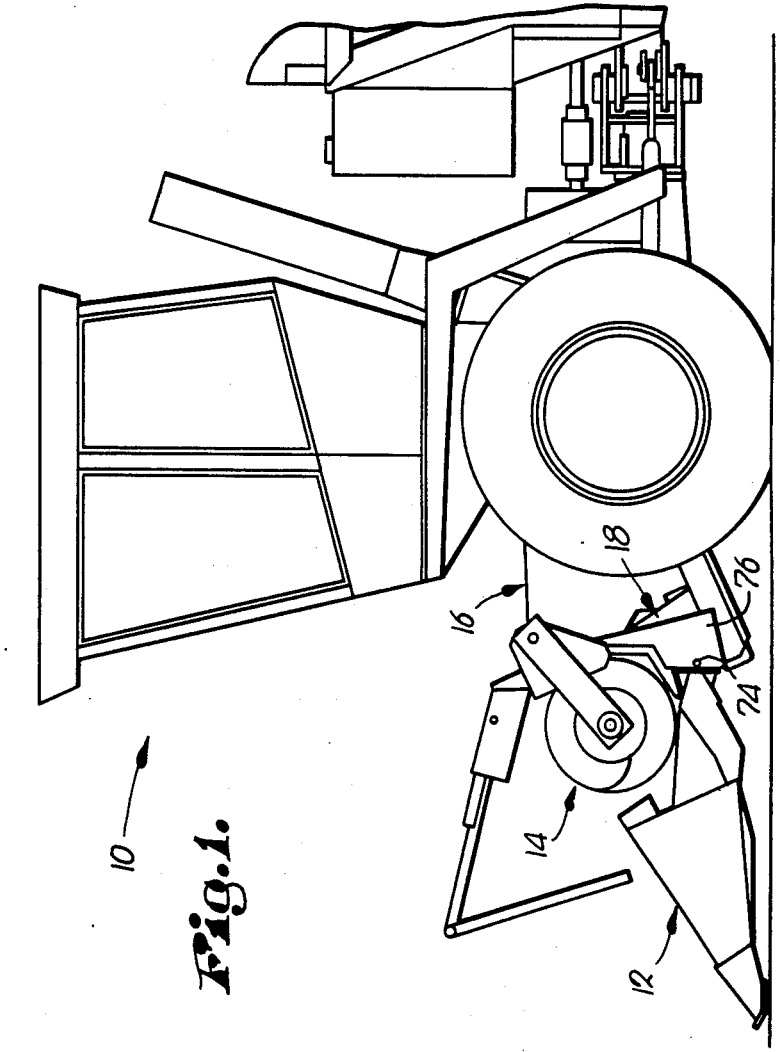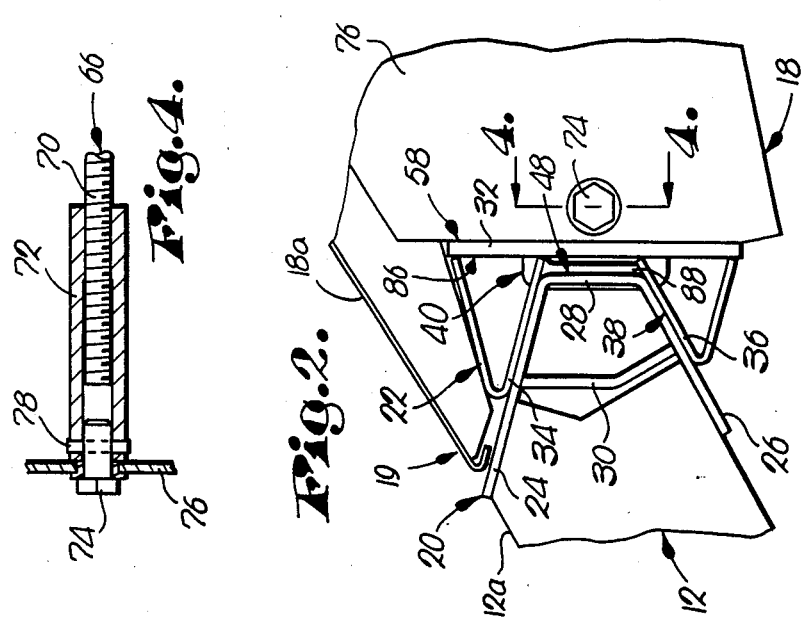

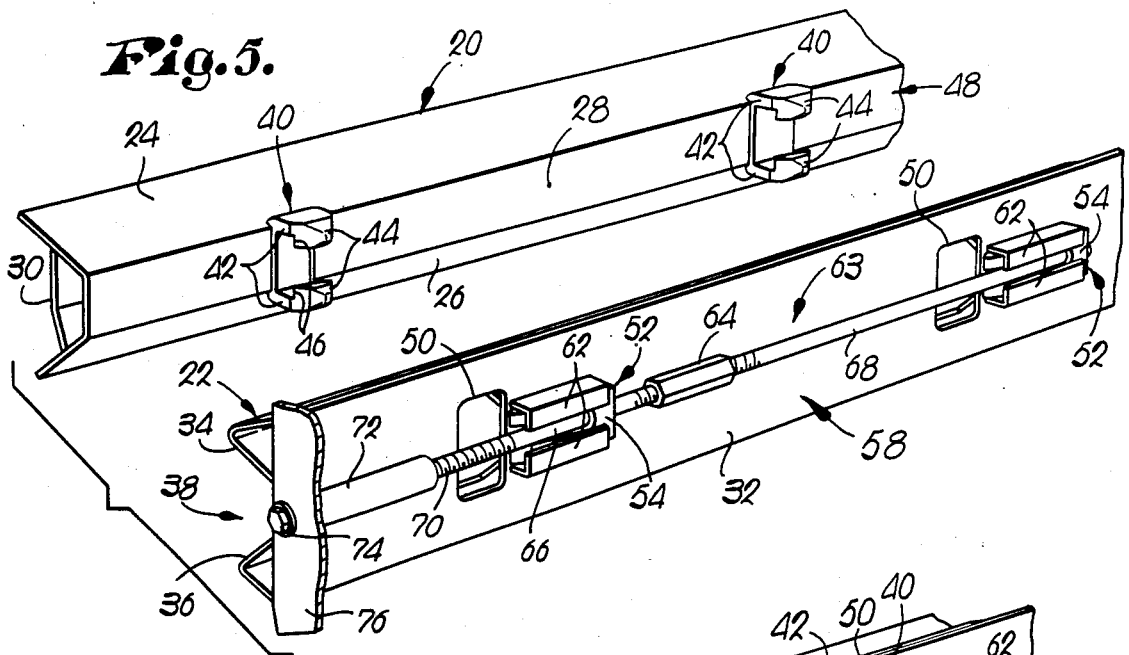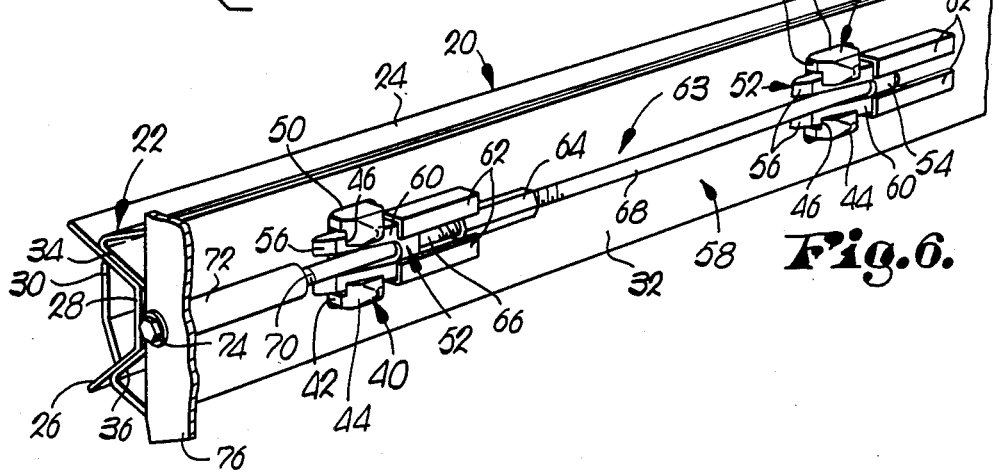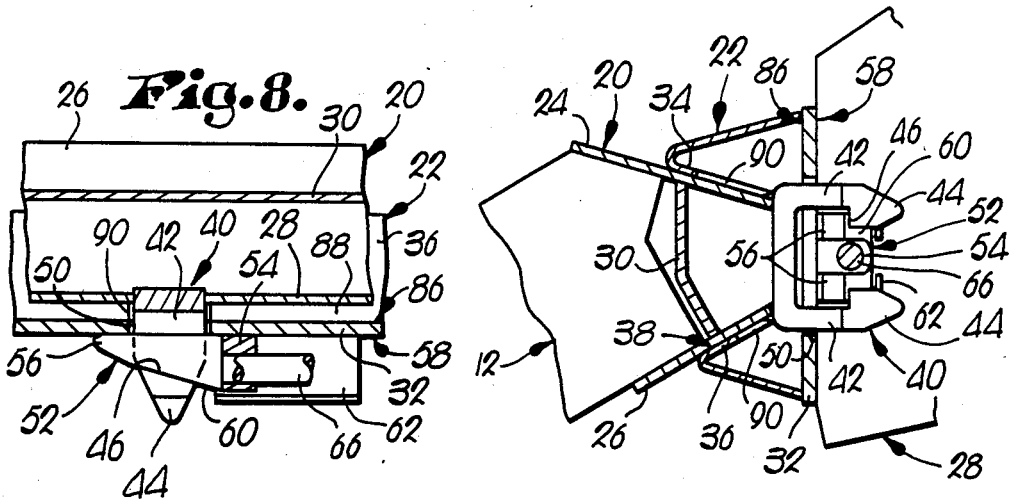

QUICK ATTACH APPARATUS FOR CROP HARVEST HEADER AND THE LIKE

This is a continuation of application Ser. No. 06/618,821, filed on June 8, 1984 now abandoned.

BACKGROUND OF THE INVENTION

1. Field of the Invention

Many types of implements for harvesting farm crops are provided with interchangeable headers necessitating quick release mechanism to facilitate easy and rapid attachment and detachment, and various kinds of such mechanisms, in an effort to meet the need, have heretofore been suggested. Numerous forms of locks, latches, hooks, catches, fasteners and the like have had certain degrees of at least partial success; others have failed or not been as troublefree as might be desired.

One of the primary deficiences of most of the prior mechanisms is their failure to hold the headers in place with such firmness and rigidity as is required to meet the abuses, stresses and unequal loads to which they are subjected during use. The headers must be raised and lowered from time to time, be capable of withstanding all resistances to turning of the implement as it is guided through the field and at the ends of crop rows, and be strong enough to endure bouncing, twisting and vibration as the implement traverses uneven terrain.

Another deficiency of prior attachment mechanisms resides in the degree of difficulty and awkwardness associated with latching and unlatching of the devices used to hold the header and main support portion of the implement in a connected condition. Such prior mechanisms have in some instances required the user to climb onto or under the machine in order to latch or unlatch, to install or remove keepers or pins, or to install or remove bolts in difficult-to-reach places.

2. Description of the Prior Art

We are familiar with U.S. Pat. Nos. 3,599,402 and 3,270,489 involving the use of adapters for mounting and dismounting grain headers such as combine corn heads on forage harvesters employing top and bottom connectors such as clevises, pins, brackets, socket elements and the like. Also, in U.S. Pat. No. 4,202,154 truncated, cone-shaped male projectors and mating socket members are employed to effect interengagement of abutment surfaces, the suggestions of all such prior art being wholly unlike the construction and manner of operation of the improvements hereinafter to be described.

SUMMARY OF THE INVENTION

In accordance with our invention, therefore, we provide an interlock between the header and the structure of the implement to which the header is removably attached, capable of holding the header against independent lateral tilting as well as against independent up and down swinging movement. In conjunction therewith, a quick release latching mechanism effects progressively increased tightness of a mating fit along the interlock and the quick release mechanism is extremely easy and convenient to operate by virtue of locating the actuator for the mechanism at one or more lateral-most ends of the support for the header, thereby avoiding the need for the operator to climb under the machine or on top of it in order to carry out his duties.

The relatively long interlock extending entirely across the rear of the header is, in effect, an intermeshing tongue and groove arrangement wherein both the tongue and the groove have the cross-sectional configuration of a truncated triangle with the groove open at one angle for reception of the tongue, permitting a wedge fit such that when the tongue is jammed into the groove or channel relative movements therebetween are eliminated. The joint is sufficiently strong to withstand all forces encountered by the header.

In conjunction with such joint we provide a wedge lock mechanism for effecting the tight fit having a keeper on the tongue which slidingly receives a reciprocable latch. As the latch becomes progressively tighter in the keeper, the tightness of the tongue in the channel also increases gradually. The control of the quick release latch is located adjacent the end of the interlock assembly for ready accessibility.

In the drawings:

FIG. 1 is a fragmentary side elevational view of a crop harvester supporting a header through use of quick attach apparatus made according to our present invention;

FIG. 2 is an enlarged, detailed, fragmentary view similar to FIG. 1, parts being removed for clearness;

FIG. 3 is a fragmentary plan view, partially in section, showing the attaching arrangement of FIGS. 1 and 2;

FIG. 4 is a fragmentary, detailed cross-sectional view taken along line 4—4 of FIG. 2;

FIG. 5 is an exploded, fragmentary perspective view of the interlock and the latching mechanism;

FIG. 6 is a view similar to FIG. 5 but with the parts joined together;

FIG. 7 is an enlarged, fragmentary cross-sectional view taken transversely of the assembly shown in FIG. 6; and FIG. 8 is a fragmentary cross-sectional view taken essentially at right angles to FIG. 7.

DETAILED DESCRIPTION OF THE DRAWINGS

For purposes of exemplifying one use of the concepts of our instant invention, there is shown in FIG. 1 of the drawings a self-propelled forage harvester 10 having a forwardmost header 12 ahead of a center-gathering auger 14 which delivers the crop from harvesting header 12 into a cutter box 16. The auger 14 is carried by and forms a part of a so-called "auger base" 18 between the header 12 and the box 16.

As more clearly shown in FIGS. 2-8, the header 12 and the base 18 are provided with elongated beams or matching members 20 and 22 respectively having their longitudinal axes disposed in transverse relationship to the normal path of travel of the implement, both members 20 and 22 fully extending end-to-end of the header 12. The members 20 and 22 each have the general cross-sectional shape of a truncated triangle such that the tongue-like member 20 (at the rearmost extremity of the header 12) is provided with upper and lower panels 24 and 26 respectively which converge toward an upright, rearwardly-facing base 28. A reinforcing bridge 30 maintains the panels 24 and 26 in proper spaced relationship.

Somewhat similarly, the beam or channel member 22 is provided with upper and lower V-shaped sections rigidly secured to the front face of a plate 32 forming a part of or added to the auger base 18, having upper and lower panels 34 and 36 respectively which converge as the plate 32 is approached, presenting a transversely V-shaped longitudinal groove 38 co-extensive in length with and adapted to receive the tongue 20.

A wedge-lock mechanism for quick release attachment of the tongue 20 to the channel member 22 includes a series of keepers 40 spaced longitudinally of the base 28 and partially recessed into openings provided in the latter and extending into the panels 24 and 26. Each of the keepers 40, rigidly connected to the member 20, is essentially U-shaped, presenting a pair of vertically spaced legs or prongs 42 which extend rearwardly from the base 28. The prongs 42 terminate in hooks 44 having innermost, beveled edges 46 (FIG. 8) in angular relationship to the rearmost, flat face 48 of the base 28. An opening 50 for receiving each keeper 40 respectively is provided in the plate 32 of member 22.

The wedge-lock mechanism includes additionally a U-shaped latch 52 for each keeper 40 respectively, each latch 52 having a bight 54 and a pair of vertically-spaced, wedge-shaped fingers 56. Each latch 52 has a flat front face such that its bight 54 and its fingers 56 are in sliding engagement with rear face 58 of the plate 32. Each finger 56 has an inclined rear edge 60, corresponding to the edges 46, which slopes toward the face 58 at the same angle as the edges 46. Each latch 52 has a pair of L-shaped guides 62 rigid to the face 58 within which the latches 52 slide toward and away from the keepers 40.

A shifter 63 for one pair of the latches 52 includes a turnbuckle (for initial adjustment purposes) having a right-and-left screw link 64 which couples a pair of rods 66 and 68, the latter of which receives the latch 52 remote from the link 64. Both rods 66 and 68 pass through the corresponding bights 54 and are rigidly secured thereto, and the rod 66 receives the latch 52 which is next adjacent the link 64.

The rod or bolt 66 has screw threads 70 remote from the link 64 receiving a tubular, internally tapped nut 72 that may be turned by use of a wrench on the flats of the head of a rotatable stud 74 which passes through an end wall 76 of the auger base 18 and into the nut 72, having connection with the latter by a crosspin 78 (FIG. 4). A second shifter 80, and another pair of latches 52 (see FIG. 3) is identical with the shifter 63, it being noted that stud 82 therefor is readily accessible at the outside of an end wall 84 of the auger base 18 opposed to the wall 76. Important to note is that when the tongue 20 is tightly fitted into the groove 38 the face 48 is separated from front face 86 of the panel 32 by a space 88 extending the full lengths of the members 20 and 22.

OPERATION

The implement 10 is advanced toward the header 12 until the openings 50 receive the keepers 40 and the groove 38 receives the tongue 20. Slots 90 (FIGS. 2 and 7) are provided in the panels 34 and 36 for the keepers 40.

The studs 74 and 82 are then turned to rotate the nuts 72 through the pins 78, drawing the rods 66 toward the walls 76 and 84. The latches 52 slide along the face 58 and the fingers 56 enter the passages between the legs 42 of corresponding keepers 40. As the edges 60 of the fingers 56 come into engagement with and slide along the edges 46 of keepers 40, the latches 52 draw the tongue 20 toward the plate 32, causing the engagement between panels 24, 26 and the panels 34, 36 to become progressively tighter.

During such jam wedging of the tongue 20 into the channel 22, the mechanical power being exerted by the wedges (i.e. the fingers 56) is a result of the fingers 56 acting on the edges 46 as they are jammed into the keepers 40, again with a progressively tighter and tighter fit. Note in FIG. 8, for example, that the fingers 56 do not "bottom out" prior to movement of the tongue 20 to its fullest extent into the channel 38, short of the base 28 coming into engagement with the plate 32. The double inclined planes of the panels 24, 26 and of the panels 34, 36 as well as of the keepers 40 and the fingers 56 at the edges 46 and 60, operate, as is now manifest, to assure an effective, strong joint between the header 12 and the plate 20, or other attachable part of the harvester 10, which is not likely to loosen or break away even after long, continued use under the severest of adverse conditions.

Our improvements are not limited in their use to forage harvesters or to any particular type of header such as row crop heads, direct cut heads used for green, chopped, grasses and haylage, or headers for picking up crops from windrows, whether or not the implement includes an auger and/or a cutter for chopping the crop being cut or otherwise handled by the header.

It is to be noted that the design of the present invention is extremely conducive to quick and easy attachment and detachment of the header. There is absolutely no need for the operator to crawl under the machine, on top of the machine, or otherwise exert untoward stress and strain in coping with hard-to-reach places. Instead, the heads of the rotatable studs 74, 82 are conveniently placed at opposite ends of the channel member 22 on the panels 76, 84 for easy access by the user. By merely turning those stud heads, release or capture of the header 12 can be quickly effected.

It is also important to note that the design of the present tongue and groove interlocking arrangement facilitates connection of the header 12 to the base 18 even though the tongue member 20 may not be perfectly aligned with the channel member 22 at initiation of the hookup operation. As a result of the vertically tapering, mating configurations of the tongue member 20 and the channel member 22, any slight discrepancy in height between the two members will be readily accommodated for as the connection process is carried out, since the tapering configurations act as guides to progressively center the members into the proper elevational positions as the two members come closer and closer in a horizontal direction. The end result is a much easier attachment procedure, resulting in less down time and avoiding frustrations associated with assuring that parts are perfectly aligned before and during an attachment process.

We claim:

1. In a farm implement having a mobile support and a crop header, said support having a longitudinal axis extending transverse to the normal path of travel of the implement and being provided with a pair of opposite, horizontally spaced, laterally disposed ends, the improvement comprising:

structure on said support and the header for effecting a load-bearing interconnection between the same; and means for releasably retaining the support and the header interconnected, said releasable means including .

a plurality of separate latches laterally spaced apart across the width of said implement and carried by said structure; and actuator means for simultaneously engaging or disengaging said plural latches, comprising an elongated, shiftable, transversely horizontally extending operating element projecting laterally outwardly beyond said latches and terminating in an outboard end adjacent a lateral end of said support, means operably coupling each of said plural latches to said element for said simultaneous operation thereof, and manipulative means operably connected to and located at said outboard end of said element for permitting manual access thereto and shifting of said element for consequent simultaneous operation of said plural latches.

* * * * *